Figure 6:
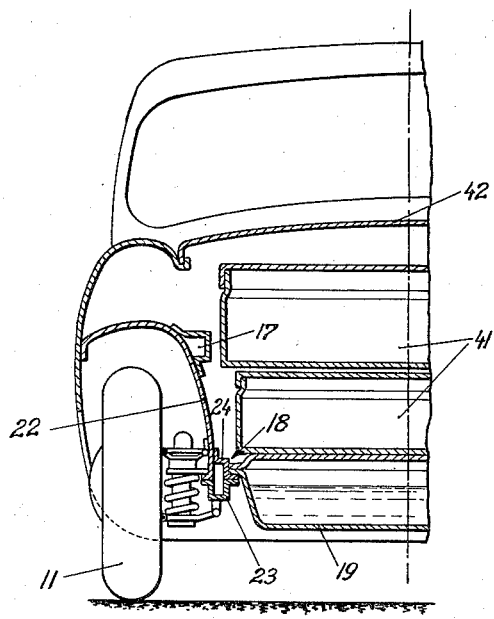

Feb. 4, 1958  J. MÜLLER  2,822,056
MOTOR VEHICLE OF THE REAR ENGINE TYPE
Filed Nov. 19, 1956  2 Sheets-Sheet 1
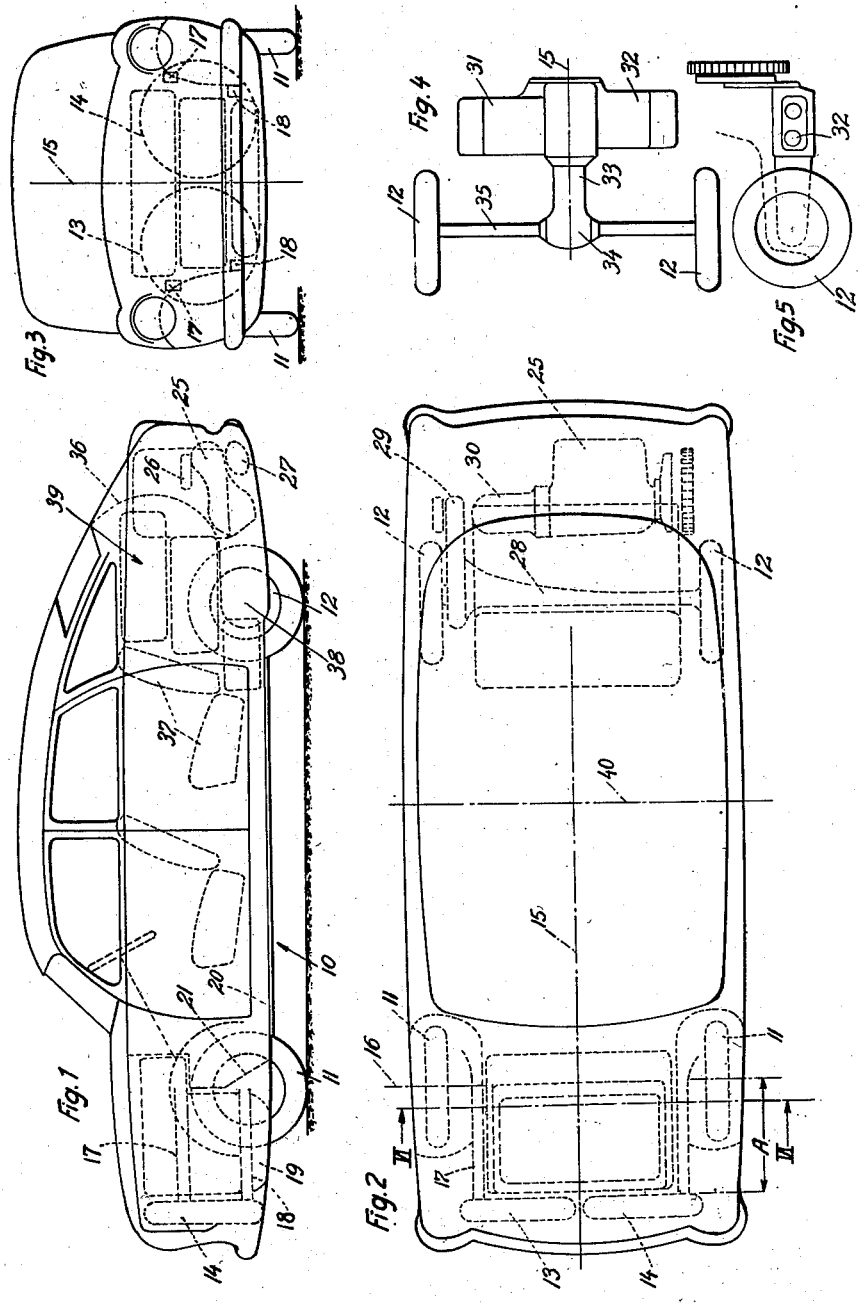
Inventor
JOSEF MÜLLER
BY Dicke and Craig
ATTORNEYS.

Feb. 4, 1958  J. MÜLLER  2,822,056
MOTOR VEHICLE OF THE REAR ENGINE TYPE
Filed Nov. 19, 1956  2 Sheets-Sheet 2

Inventor
JOSEF MÜLLER
BY Dicke and Craig
ATTORNEYS.

United States Patent Office 2,822,056
Patented Feb. 4, 1958

2,822,056

MOTOR VEHICLE OF THE REAR ENGINE TYPE

Josef Müller, Stuttgart-Riedenberg, Germany, assignor to Daimler-Benz Aktiengesellschaft, Stuttgart-Unterturkheim, Germany Application November 19, 1956, Serial No. 623,137

Claims priority, application Germany November 21, 1955

7 Claims. (Cl. 180—54)

My invention relates to a motor vehicle of the rear engine type.

The objects of my invention are to increase the space available in the vehicle for the accommodation of luggage; to enhance the safety of passengers against injury in event of a head-on collision and to improve the riding qualities and the springing of the vehicle.

Further objects of my invention will appear from a detailed description of a preferred embodiment thereof following hereinafter with reference to the accompanying drawings. It is to be clearly understood, however, that the invention is in no way limited to the details of such embodiment and that the terms and phrases used in such detailed description have been chosen for purposes of explanation rather than restriction or limitation of the invention.

In the drawings

Fig. 1 is a more or less diagrammatic elevation of a passenger car embodying the present invention, Fig. 2 is a plan view thereof, Fig. 3 is a front view of the car, Fig. 4 illustrates the rear axle and a modified driving unit associated therewith, Fig. 5 is an elevation of what is shown in Fig. 4, and Fig. 6 is a partial transverse vertical section taken substantially along the line VI—VI.

The motor vehicle illustrated in Figs. 1, 2 and 3 is a passenger car comprising a body 10 carried by a pair of front wheels 11 and by a pair of rear wheels 12 which are mounted on the body by a suitable conventional suspension means for relative up and down movement. In the front portion of the body a pair of spare wheels 13 and 14 is mounted in transverse vertical position, one spare wheel being disposed to the left and the other one to the right of the vertical central longitudinal plane indicated by the dash-dotted lines 15 in Figs. 2 and 3. The spare wheels 13 and 14 are spaced a distance A not less than their diameter from a transverse horizontal line 16 extending through the centers of the front wheels 11.

The body includes front wheel housings 22. The beams each pair comprising an upper beam 17 and a lower beam 18. These four beams have their front ends disposed directly behind the spare wheels 13 and 14 for the purpose of bracing them in event of a head-on collision. A fuel tank 19 is carried by the body 10 between the front wheels 11 in front of the transverse line 16 and is disposed as low as possible, preferably below a level located slightly above the line 16 extending through the centers of the wheels 11.

The floor panel 20 of the passenger compartment extends forwardly to a point between the front wheels 11, and a transverse upright partition 21 adjoins the floor panel 20 at the front end thereof.

The space between the spare wheels 13, 14 and the partition 21 above the gasoline tank 19 constitutes a luggage compartment of considerable capacity.

The body includes front wheel housings 22. The beams 17 and 18 are preferably disposed adjacent to such housings and are hollow sheet metal beams which in part are formed by the wheel housings. Thus it will appear from Fig. 6 that each of the upper beams 17 comprises a flanged channel member which has its flanges placed on and rigidly connected with the housing 22. The lower beam 18 is formed by a flanged channel member 23 placed upon the lower edge of the housing 22 and extending inwardly therefrom and by an upper channel member 24 which extends from the inner flange of member 23 to the housing 22 in contact with the latter.

In this manner the housing 22 is reinforced by the beams 17 and 18.

Preferably the body is of the self-supporting type and of streamline shape.

In the tail end of the body the driving unit is disposed comprising an engine and a transmission housing.

Preferably the engine has a row 25 of cylinders, such row extending parallel to the transverse line 16. The cylinders are inclined to the rear as will appear from Fig. 1. Resilient brackets 26 and 27 including elements of rubber or a rubber like material are employed as a mounting means for the driving unit. The wheels 12 rotatably mounted on a rear axle 28 may be connected by a common shaft driven by a chain and sprockets included in a flat housing 29 that extends from the transmission 30 of the driving unit to the axle 28.

Alternatively, the driving unit may include a pair of horizontal cylinder block 31 and 32 which are oppositely disposed with respect to the central vertical horizontal plane 15 of the body. In this event the transmission 33 is disposed between the engine and the rear axle transmission 34 mounted on the rear axle 35 in the conventional manner.

The passenger compartment extends from the partition 21 located between the front wheels up to a rear partition 36 disposed in front of the engine compartment in the tail of the body. The partition 36 is disposed way behind the rear wheels.

The body is provided with a rear seat 37 disposed in front of a horizontal transverse line 38 connecting the centers of the rear wheels. The space above the line 38 and between the rear seat and the partition 36 constitutes another luggage compartment indicated at 39.

From the above description it will appear that the structure of the front portion of the vehicle serves primarily the purpose of protecting the passengers in event of a head-on collision. This is the reason why the two spare wheels 13 and 14 are disposed below the conventional front hood 42 in transverse vertical position and why the spare wheels 13 and 14 are braced on their backs by the front ends of the beams 17 and 18. In event of a head-on collision smashing the front of the body, one or both of the spare wheels 13 and 14 will have their outer portions pressed against the beams 17 and 18. Should the colliding object hit the body more in the center affecting the inner portions of the spare wheels 13 and 14, the wheels will be braced against the gasoline tank 19. Thus, the spare wheels constitute an armature as it were protecting the legs and the lower portions of the bodies of the passengers seated in the front seats. Preferably, the gasoline tank 19 is made as stiff as possible by the use of suitable sheet metal in order to offer considerable protection per se in event of a head-on collision. Should it happen, however, that the gasoline tank is smashed to such an extent as to leak, the gasoline, because of the low level of the tank will escape immediately into the atmosphere without getting into contact with any highly heated portions of the driving unit.

The total mass of the spare wheels 13, 14 of the gasoline tank 19 and of the beams 17 and 18 is so proportioned to the mass of the driving unit 25, 29, 30 that the resultant transverse horizontal axis of the inertia momentum is substantially equally spaced from such masses. That axis is indicated in Fig. 1 by the dash-dotted line 40. As a result the vehicle has excellent riding and springing qualities.

The front portion of the vehicle projecting forwardly beyond the front wheels a considerable distance and the mass of the driving unit disposed way in the rear will result in such a large inertia momentum about the transverse axis 40 that the riding qualities of the vehicle are better than in prior vehicles of the rear engine type without adversely affecting the distribution of the load over the wheels. Although the floor panel 20 extends far in front nearly up to the line 16, considerable luggage space is obtained between the spare wheels 13, 14 and the partition 21 above the tank 19 disposed at a low level. In Fig. 6 I have shown trunks 41 which are placed in such luggage compartment beneath the front hood 42. Also considerable space for the accommodation of luggage is available at 39. This space is accessible from the interior of the passenger compartment. The total luggage space is twice that of prior vehicles of a similar size.

While the vehicle illustrated in the drawings is a closed passenger car, my invention is equally applicable to station wagons, delivery cars, small busses or low sporting cars.

What I claim is:

1. A motor vehicle comprising a body, a pair of front wheels and a pair of rear wheels mounted on said body for carrying it, a pair of spare wheels mounted in the front portion of said body in vertical position, one to the left and one to the right of the vertical central longitudinal plane of said body, said spare wheels being spaced a distance not less than their diameter from a transverse horizontal line extending through the centers of said front wheels, said body including two pairs of horizontal beams, each pair comprising an upper beam and a lower beam having their front ends disposed behind one of said spare wheels for bracing the same in event of a collision, a fuel tank carried by said body between said front wheels in front of said transverse line, and a driving unit disposed in the tail end of said body, said driving unit comprising an engine and a transmission housing.

2. A motor vehicle as claimed in claim 1 in which the total mass of said spare wheels, said gasoline tank and said beams is so proportioned to the mass of said driving unit that the resultant transverse horizontal axis of inertia momentum is substantially equally spaced from said masses.

3. A motor vehicle as claimed in claim 1 including a floor panel extending forwardly to a point between said front wheels and a transverse upright partition adjoining said floor panel at the front end thereof, the space between said spare wheels and said partition above said gasoline tank constituting a luggage compartment.

4. A motor vehicle as claimed in claim 1 in which said driving unit is disposed behind a horizontal transverse line connecting the centers of said rear wheels, said body being provided with a rear seat disposed in front of said last mentioned horizontal transverse line, the space above said line and between said rear seat and said driving unit constituting a luggage compartment.

5. A motor vehicle as claimed in claim 1 in which said body includes front wheel housings, said beams being disposed adjacent to said housings and being hollow sheet metal beams formed in part by said wheel housings.

6. A motor vehicle as claimed in claim 1 in which said driving unit includes an engine having a row of cylinders extending parallel to said transverse line and being inclined to the rear.

7. A motor vehicle as claimed in claim 1 in which said driving unit includes a pair of horizontal cylinder blocks oppositely disposed with respect to the central vertical longitudinal plane of said body.

References Cited in the file of this patent

UNITED STATES PATENTS 2,168,108   Bunau-Varilla _____ Aug. 1, 1939

FOREIGN PATENTS 872,978   France _____ Mar. 2, 1942
652,422   Great Britain _____ Apr. 25, 1951
717,069   Great Britain _____ Oct. 20, 1954